US006175550B1

(12) United States Patent
van Nee

(10) Patent No.: US 6,175,550 B1
(45) Date of Patent: *Jan. 16, 2001

(54) ORTHOGONAL FREQUENCY DIVISION MULTIPLEXING SYSTEM WITH DYNAMICALLY SCALABLE OPERATING PARAMETERS AND METHOD THEREOF

(75) Inventor: Richard D. J. van Nee, De Meern (NL)

(73) Assignee: Lucent Technologies, Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/834,684

(22) Filed: Apr. 1, 1997

(51) Int. Cl.[7] .................................................... H04J 11/00
(52) U.S. Cl. ............................................ 370/206; 375/261
(58) Field of Search .................................. 370/204, 205, 370/206, 207, 208, 212, 213, 215, 482, 543, 210, 252, 465, 468; 375/260, 331, 355, 244, 226, 261

(56) References Cited

U.S. PATENT DOCUMENTS

| 5,063,574 | * | 11/1991 | Moose | 375/27 |
| 5,291,289 | * | 3/1994 | Hulyalkar et al. | 348/723 |
| 5,748,147 | * | 5/1998 | Bickley et al. | 342/457 |
| 5,757,766 | * | 5/1998 | Sugita | 370/206 |
| 5,771,224 | * | 6/1998 | Seki et al. | 370/206 |
| 5,822,323 | * | 10/1998 | Kancko et al. | 370/480 |
| 5,848,107 | * | 12/1998 | Philips | 345/342 |
| 5,952,922 | * | 9/1999 | Shober | 340/572.4 |
| 6,009,073 | * | 12/1999 | Kaneko | 370/203 |

* cited by examiner

*Primary Examiner*—Michael O'Neill
*Assistant Examiner*—Kim T. Nguyen

(57) ABSTRACT

The scaleable OFDM system according to the principles of the present invention provides increased flexibility and adaptability by providing scaling of the operating parameters and/or characteristics for the OFDM system. For example, control circuitry can scale the bit rate by scaling of the OFDM symbol duration, the number of carriers and/or the number of bits per symbol per carrier. Scaleability permits the scaleable OFDM system to operate in various communications environments requiring various operating parameters and/or characteristics. By scaling the operating parameters and/or characteristics of the OFDM system when control circuitry determines that different operating parameters and/or characteristics are necessary or advantageous, the control circuitry can dynamically change the operating parameters and/or characteristics, thereby providing compatibility or the desired performance. For example, by dynamically scaling the bit rate, widely varying signal bandwidths, delay spread tolerances and signal-to-noise ratio (SNR) requirements can be achieved. As such, a scaleable OFDM system is particularly suitable for application in mobile, wireless communication devices, which support a variety of services, in a variety of environments, indoor as well as outdoor and in radio channels with differing bandwidths.

29 Claims, 3 Drawing Sheets

1.2 MHz/CARRIER

ORTHOGONAL FREQUENCY DIVISION MULTIPLEXING SYSTEM WITH DYNAMICALLY SCALABLE OPERATING PARAMETERS AND METHOD THEREOF

BACKGROUND OF THE INVENTION

1. Field of The Invention

This invention relates to communication systems and, more particularly, OFDM (Orthogonal Frequency Division Multiplexing) modulation schemes which are suitable to provide a wide range of information transfer rates in a wide range of physical environments.

2. Description of Related Art

OFDM is a block-oriented modulation scheme that maps N data symbols into N orthogonal carriers separated by a distance of 1/T, where T is the block period. As such, multi-carrier transmission systems use OFDM modulation to send data bits in parallel over multiple, adjacent carriers (also called tones or bins). An important advantage of multi-carrier transmission is that inter-symbol interference due to signal dispersion (or delay spread) in the transmission channel can be reduced or even eliminated by inserting a guard time interval between the transmission of subsequent symbols, thus avoiding an equalizer as required in single carrier systems. This gives OFDM an important advantage over single carrier modulation schemes. The guard time allows delayed copies of each symbol, arriving at the receiver after the intended signal, to die out before the succeeding symbol is received. OFDM's attractiveness stems from its ability to overcome the adverse effects of multi-channel transmission without the need for equalization. A need exists for a flexible OFDM system which provides the advantages of OFDM to a variety of communication environments.

SUMMARY OF THE INVENTION

The scaleable OFDM system according to the principles of the present invention provides increased flexibility and adaptability by providing scaling of the operating parameters and/or characteristics for the OFDM system. For example, control circuitry can scale the transmission rate by scaling of the OFDM symbol duration, the number of carriers and/or the number of bits per symbol per carrier. Scaleability permits the scaleable OFDM system to operate in various communications environments requiring various operating parameters and/or characteristics. By scaling the operating parameters and/or characteristics of the OFDM system when control circuitry determines that different operating parameters and/or characteristics are necessary or advantageous, the control circuitry can dynamically change the operating parameters and/or characteristics, thereby providing compatibility or the desired performance. For example, by dynamically scaling the bit rate, widely varying signal bandwidths, delay spread tolerances and signal-to-noise ratio (SNR) requirements can be achieved. As such, a scaleable OFDM system is particularly suitable for application in mobile, wireless communication devices, which support a variety of services, in a variety of environments, indoor as well as outdoor and in radio channels with differing bandwidths.

In accordance with aspects of certain embodiments of the scaleable OFDM modulation system, a coded OFDM modulation system can be designed with an upper limit on the number of carriers and a variable symbol duration. The control circuitry can dynamically scale the number of carriers below the upper limit on the number of carriers to decrease the signal bandwidth and the transmission rate while delay spread tolerance remains the same. The control circuitry can also dynamically increase the symbol duration to decrease the transmission rate and the signal bandwidth and provide an increase in delay spread tolerance. In accordance with other embodiments, the scaleable OFDM modulation system achieves variable transmission rates using adaptive coding where different coding schemes are used to improve the link reliability and/or to decrease the peak-to-average power ratio.

In accordance with yet other embodiments of the scaleable OFDM modulation system, scaleable transmission rates permit asymmetric data rates between mobile units and base stations. For example, the mobile units can have lower data rates than the base stations by allocating only a fraction of the total number of carriers to each mobile, while the base stations transmit at all carriers simultaneously. Additionally, during data downloading for example, a mobile unit could have a larger downlink data rate than uplink data rate. In accordance with other aspects of a scaleable OFDM system, mobile units and base stations using the same antennas for both transmit and receive can benefit from adaptive antennas with any additional processing done at the base station, thereby keeping the mobile as simple as possible. The scaleable OFDM modulation system can use an adaptive antenna at the base by sending feedback through the uplink, for example, when channel characteristics of uplink and downlink are not identical.

BRIEF DESCRIPTION OF THE DRAWINGS

Other aspects and advantages of the present invention may become apparent upon reading the following detailed description and upon reference to the drawings in which.

DETAILED DESCRIPTION OF THE DRAWINGS

Figure 1:
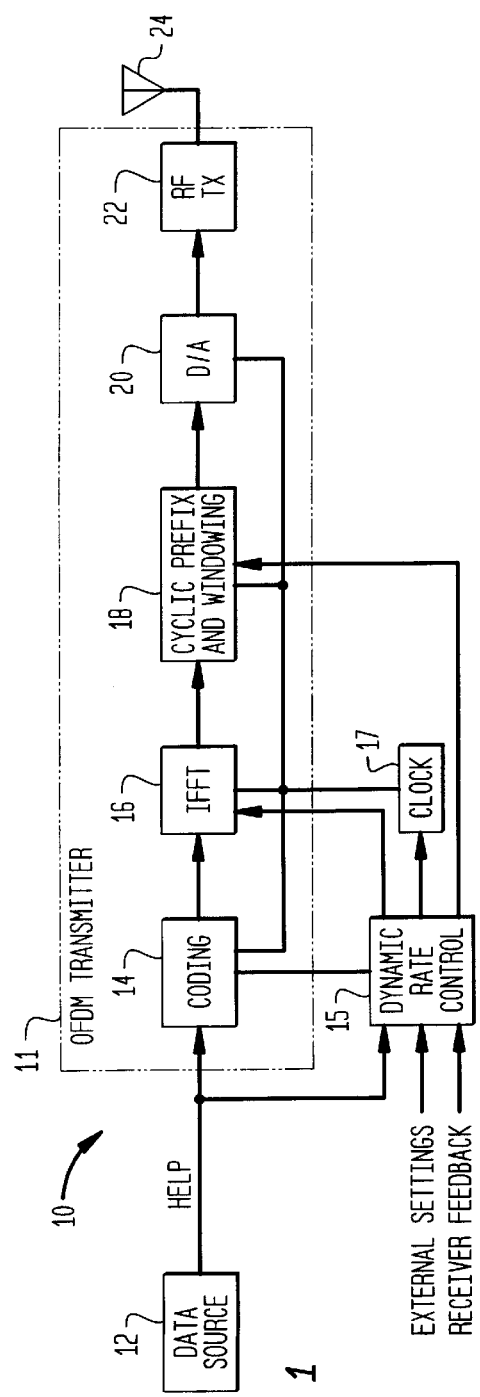
FIG. 1 shows a block diagram of an embodiment of an OFDM transmitter according to certain principles of the present invention.

Illustrative embodiments of the improved OFDM system with scaleable operating parameters and/or characteristics according to the principles of the present invention are described below as the improved OFDM system might be implemented to provide a flexible communications system for use in a variety of communication environments. Scaleability permits the scaleable OFDM system to operate in various communications environments requiring various operating parameters and/or characteristics. By scaling the operating parameters and/or characteristics of the OFDM system when control circuitry determines that different operating parameters and/or characteristics are necessary or advantageous, the control circuitry can dynamically change the operating parameters and/or characteristics, thereby providing compatibility or the desired performance. For example, by dynamically scaling the bit rate, widely varying signal bandwidths, delay spread tolerances and signal-to-noise ratio (SNR) requirements can be achieved.

The scaleable OFDM systems can be characterized by various operating parameters, including the following:

number of carriers (N);
symbol duration ($T_s$);
number of bits per symbol per carrier (m);
forward error correction coding scheme;
coding rate; and
the fraction of the symbol duration that is used as guard time.

By varying these parameters, various operating characteristics can be scaled, including the following:

transmission rate (bit rate or data rate);
signal-to-noise ratio (the larger the SNR, the lower the bit error rate);
delay-spread tolerance;
signal bandwidth; and
implementation complexity The scaleable OFDM system can scale operating parameters and/or characteristics in various ways. For example, to dynamically scale the transmission rate, the scaleable OFDM system can dynamically adjust the symbol duration, coding rate, the number of bits per symbol per carrier and/or the number of carriers depending upon the required or desired operating parameters and/or characteristics. In this particular example, depending upon how the control circuitry scales transmission rate, the scaleable OFDM system scales delay spread tolerance, signal to noise ratio, and signal bandwidth in different ways, making the scaleable OFDM system an attractive scheme for the implementation of flexible, (dynamically) scaleable communication systems.

For example, to double the transmission rate of the scaleable OFDM system the following operating parameters and/or characteristics of the system can be dynamically scaled or adjusted:

1. The coding rate. In general, a channel code is applied to reduce the rate of bit errors caused by OFDM-specific channel impairments, such as multipath among the carriers. The rate of such a code can be varied to trade off bit rate against bit error rate.
2. The carrier modulation scheme. By doubling the number of bits per symbol per carrier, the bandwidth and delay spread tolerance does not change, but the SNR is reduced, thereby resulting in a higher bit error rate.
3. The symbol duration. By halving the symbol duration, the delay spread tolerance is halved, signal bandwidth is doubled, but implementation complexity is only increased by a factor of 2 (due to the speed-up by a factor of two).
4. The number of carriers. By doubling the number of carriers, delay spread tolerance remains the same, the signal bandwidth doubles and the implementation complexity is quadrupled (both number of operations and speed are doubled) for an IDFT implementation or by 2(n+1)/n if an IFFT implementation is used.

An additional scaling parameter which can be changed is the ratio of guard time and symbol time. Changing this ratio affects SNR (a larger relative guard time claims energy that would otherwise go into the signal) and transmission rate (a larger relative guard time reduces the bit rate) and the delay-spread tolerance (a larger relative guard time improves the resistance against delay-spread).

FIG. 1 shows an OFDM transmitter 10 having signal circuitry 11 which receives a data stream of data bits from a data source 12. The coding block 14 receives the data stream and partitions the data stream into successive groups or blocks of bits. The coding block 14 introduces redundancy for forward error correction coding. In certain embodiments according to other aspects of the present invention, variable data rates with OFDM are achieved by using different forward error correction coding schemes and/or variable modulation schemes for each carrier as controlled by dynamic control circuitry 15. For example, if a mobile unit is at the edge of a coverage zone, the dynamic control circuitry can decrease the coding rate to lower the data rate with the advantage of increased delay spread tolerance and better SNR performance. Such a decrease in coding rate is followed by a decrease in spectral efficiency (amount of bits per second which can be transmitted in a certain bandwidth) proportional to the decrease in coding rate.

In accordance with the principles of the present invention, the dynamic control circuitry 15 can be responsive to any of a number of possible inputs to set the coding block 14 to the appropriate coding rate. For example, in a transceiver embodiment, the dynamic rate control circuitry 15 can detect transmission errors, such as through feedback from an OFDM receiver (FIG. 4) and dynamically reduce the coding rate. Alternatively, each data packet could have a fixed code indicating the appropriate coding rate, or in a transceiver application, the coding scheme could mirror the coding rate of the received input from another transmitter (not shown). Finally, the dynamic rate control circuitry 15 could be responsive to external settings to set the coding rate.

In similar fashion, the control circuitry 15 can respond to a variety of inputs by scaling the number of bits per symbol per carrier (for example, by changing the constellation size in embodiments using phase shift keying (PSK) modulation). By increasing the number of bits per symbol per carrier, the bandwidth and delay spread tolerance do not change, but the SNR is reduced resulting in a higher bit error rate. To scale the number of bits per symbol per carrier, for example, the dynamic rate control circuitry 15 can change from QPSK (quaternary or 4-PSK) modulation to other phase modulations, such as 8-PSK, or to other modulation schemes, such as QAM (quadrature amplitude modulation, e.g., 16-QAM).

The blocks of coded data bits are input into an N-points complex IFFT (Inverse Fast Fourier Transform) 16, where N is the number of the OFDM carriers. In this particular embodiment, the IFFT 16 is performed on blocks of 2N coded data bits received from the coding block 14. In practice, the transmitter 10 has to use oversampling to produce an output spectrum without aliasing which introduces unwanted frequency distortion due to (intended or unintentional) low pass filtering in subsequent stages of the transmitter or in the transmission channel. Thus, instead of an N-points IFFT 16, an M-points IFFT 16 is actually done where M>N to perform the oversampling. These 2N bits are converted into N complex numbers, and the remaining M-N input values are set to zero.

A clock 17 provides a time base for the IFFT 16, and the output of the IFFT 16 is parallel-to-serial converted to produce an OFDM symbol. In particular embodiments according to the principles of the present invention, the control circuitry 15 scales operating parameters and characteristics, such as transmission rate, by changing the symbol duration $T_s$ while keeping the number of carriers N constant. In this particular embodiment, the control circuitry 15 accomplishes this by controlling the clock 17 to adjust the time base to the IFFT 16. By decreasing the symbol duration, an inversely proportional increase in the transmission rate is achieved. At the same time, the delay spread tolerance is decreased. However, this is usually not a problem, because the higher data rate also means a decrease in range, and lower range means lower delay spread values.

As an example, consider an OFDM system which has to support applications ranging from mobile telephony, with raw data rates in the order of 270 kbps, to indoor wireless LANs, with data rates up to 20 Mbps. Maximum delay spread requirements are 16 µs for mobile telephony down to about 200 ns for wireless LANs. Further, we require the OFDM signal to occupy a bandwidth of 200 kHz for the mobile telephony case, in order to be compatible with GSM channel spacing. All these requirements can be met by using OFDM with 32 carriers and a variable symbol duration $T_s$ of 200 µs down to 2 µs. For a symbol duration of 200 µs, a guard time of 20 µs is included to deal with the delay spread. This gives a carrier spacing of 1/(180 µs)=55.6 kHz. This means there are exactly 36 carriers possible in a bandwidth of 200 kHz. By using 4 carriers as guard band, in order to fulfill spectrum requirements, 32 carriers remain for data transmission. Using QPSK with 2 bits per carrier per symbol, this gives a raw data rate of 32.2/(200 µs)=320 kpbs.

By decreasing the OFDM symbol duration in the above described example, the data rate can be increased at the cost of a decreased delay spread tolerance. The maximum allowable delay spread is proportional to the OFDM guard time. Hence, for wireless LANs with a maximum tolerable delay spread of 200 ns, the symbol duration can be decreased to 2.5 µs, including a guard time of 250 ns. These parameters give an occupied bandwidth of 16 MHz and a raw data of 25.6 Mbps.

Table 1 lists several parameter options for various scaleable transmission or data rates. The first three options are for 32 carriers, the next three for 64 carriers, showing larger delay spread tolerance and a slightly smaller occupied bandwidth.

TABLE 1

Examples of parameter options for scaleable data rates, assuming QPSK modulation of all carriers.

| Symbol duration [µs] | Guard time [µs] | Number of carriers | Bandwidth [MHz] | Raw data rate [Mbps] |
|---|---|---|---|---|
| 200 | 20 | 32 | 0.2 | 0.32 |
| 10 | 1 | 32 | 4 | 6.4 |
| 2.5 | 0.25 | 32 | 16 | 25.6 |
| 400 | 40 | 64 | 0.19 | 0.32 |
| 20 | 2 | 64 | 3.78 | 6.4 |
| 5 | 0.5 | 64 | 15.11 | 25.6 |

The advantage of this OFDM modulation system over the existing GMSK modulation of GSM is higher spectrum efficiency and better spectrum properties in terms of adjacent channel interference. OFDM can have relatively large peak-to-average power ratio, but dynamically scaling the number of carriers can reduce the peak-to-average power ratio.

In this particular embodiment, the control circuitry 15 can provide variable transmission rates as well as other operating features by scaling the number of carriers. By transmitting a subset of the maximum number of carriers designed for the particular OFDM system, the decrease in data rate is proportional to the decrease in the number of transmitted carriers. Decreasing the number of transmitted carriers can also combine modulation technique and Medium Access Control (MAC), since multiple users can transmit simultaneously in the same band, using different sets of carriers. An additional advantage of such an approach is that the peak-to-average power ratio per user is reduced. This means a better power efficiency can be achieved, which is very important for battery-driven devices. Alternatively, the dynamic control circuit 15 can scale the number of carriers by directing the modulation of only part of the phases onto adjacent carriers. Such a result is advantageous if the encoder has to operate in a channel with a smaller available bandwidth.

In accordance with certain embodiments of the present invention, the dynamic control circuitry 15 can dynamically change N to vary the number of carriers. For example, the N-points IFFT 16 can be dynamically reduced to a X-points IFFT 16 where X<N. In this particular example, the IFFT 16 is designed to handle the N carriers as the maximum number of carriers and dynamically scaled to less than N carriers by performing an X-point IFFT 16 according to the control signals from the dynamic rate control circuitry 15. Alternatively, the dynamic control circuitry 15 can dynamically direct the OFDM transmitter 10 to transmit fewer than N carriers by calculating the IFFT for less than 2N input bits, leaving the other values zero and thereby permitting multiple access.

To decrease the sensitivity to inter-symbol interference, the cyclic prefixer and windowing block 18 copies the last part of the OFDM symbol and augments the OFDM symbol with the copied portion of the OFDM symbol. This is called cyclic prefixing. The control circuitry 15 can control the cyclic prefixer and windowing block 18 to adjust the guard time and/or the fraction of the guard time to symbol duration, for example, to the values listed for the above OFDM system example. To reduce spectral sidelobes, the cyclic prefixing and windowing block 18 performs windowing on the OFDM symbol by applying a gradual roll-off pattern to the amplitude of the OFDM symbol. The OFDM symbol is input into a digital-to-analog converter after which it is sent to the transmitter front-end 22 that converts the baseband wave form to the appropriate RF carrier frequency in this particular embodiment for transmission over antenna 24.

Figure 2:
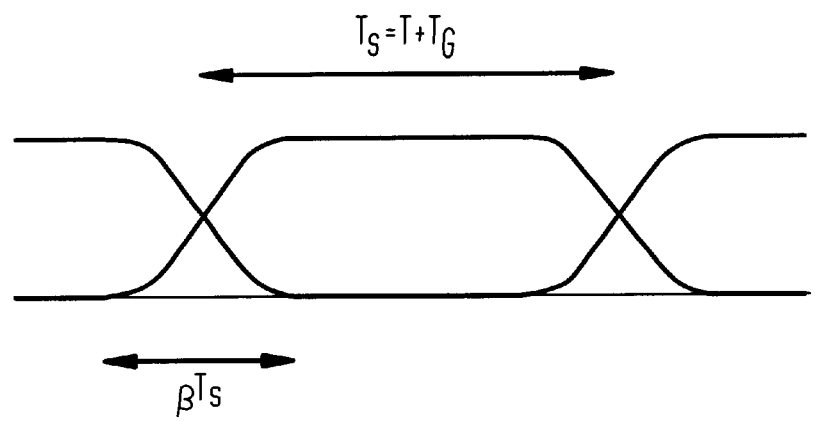
FIG. 2 shows a diagram for explaining the windowing of OFDM symbols.
Figure 3:
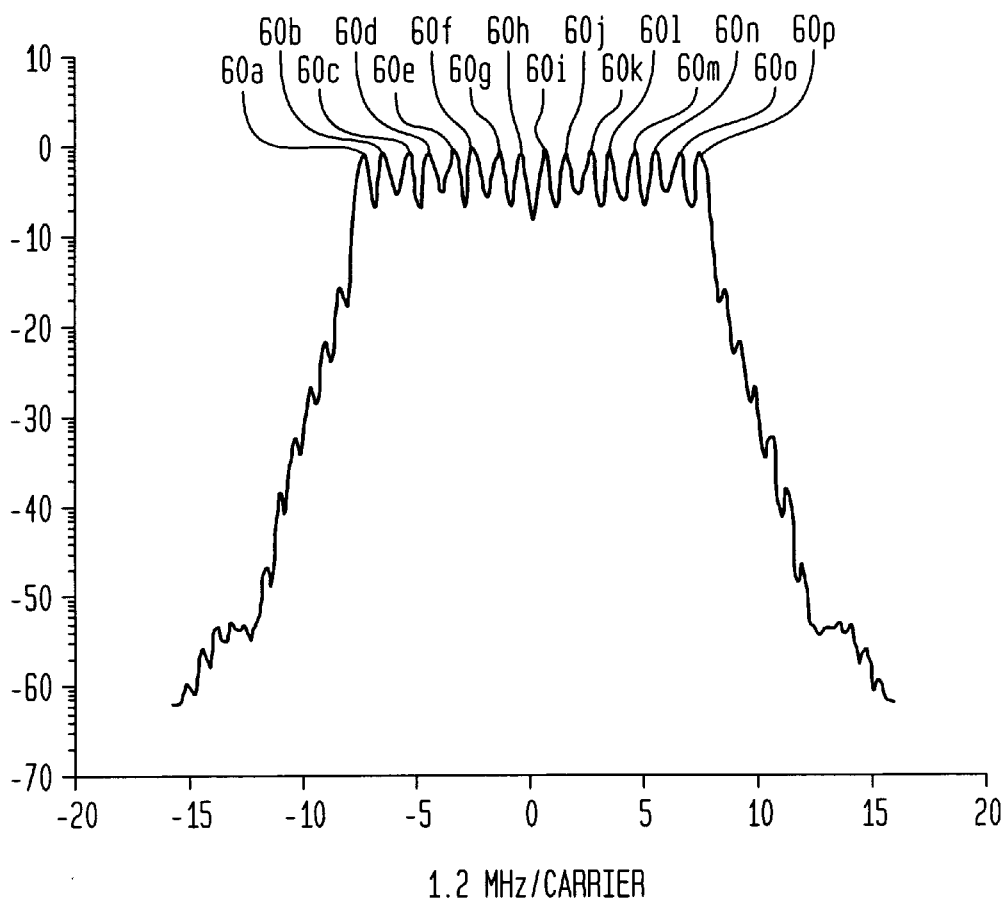
FIG. 3 shows a plot of an OFDM power spectrum for explaining the effects of changes to certain parameters of an OFDM transmitter.

FIG. 2 shows a basic representation of the windowing of an OFDM symbol where $T_s$ is the total symbol duration, T is the FFT time, i.e., there are N samples in T seconds. The carrier spacing is 1/T in Hz, and $T_G$ is the guard time which helps reduce the intersymbol interference caused by multipath. The roll-off time is represented by β $T_s$ where β is the roll-off factor. FIG. 3 shows an OFDM power spectrum in dB. The x-axis is normalized to carrier spacing, and the three (3) dB bandwidth has 16 carriers 60a–60p. Changing the FFT time T will change the spacing between the carriers 60a–p. Increasing the number of carriers N for a constant sampling rate 1/T will increase the number of carriers 60a–p while keeping the carrier spacing fixed, thereby increasing the width of the transmitted OFDM power spectrum. Decreasing the number of carriers N will similarly lead to decreasing the width of the transmitted OFDM power spectrum. Decreasing the sampling rate 1/T will increase T and decrease the carrier spacing, thereby decreasing the width of the transmitted OFDM symbol.

Figure 4:
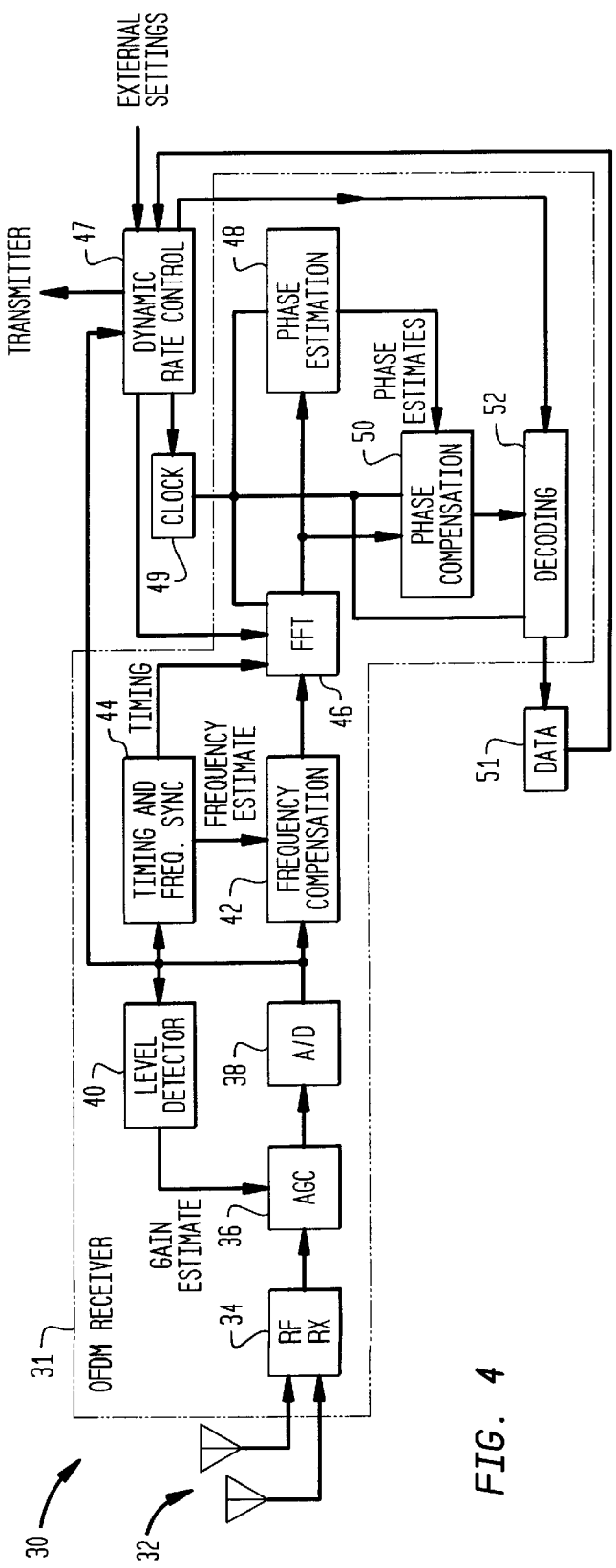
FIG. 4 shows a block diagram of an embodiment of an OFDM receiver according to certain principles of the present invention.

With particular reference to FIG. 4, the transmitted OFDM signal is received by an OFDM receiver 30 having signal circuitry 31 through a selected antenna 32. The OFDM signal is processed (down converted) using the receive circuitry 34 and automatic gain control (AGC) block 36. The processed OFDM signal is input into an analog-to-digital converter 38. The digital OFDM signal is received by a level detector 40 to provide a gain estimate feedback signal to the AGC 36. The digital OFDM signal is also received by a frequency compensation block 42 and a timing and frequency synchronization block 44. The timing and frequency synchronization block 44 acquires the OFDM symbol timing and provides a frequency estimate signal to the frequency compensation block 42 to correct for initial frequency offset and a timing signal to a Fast Fourier Transform (FFT) block 46.

In accordance with aspects of the present invention, dynamic control circuitry 47 provides scaleable operating parameters and/or characteristics at the receiver 30. The dynamic control circuitry 47 can receive inputs from the transmitter 10 (FIG. 1), from external settings and/or from the data destination block 51. In response, the dynamic rate control circuitry 47 controls the operation of the FFT 46 which is driven by a time base provided by clock 49. The dynamic control circuitry 47 can dynamically change the symbol duration by altering the time base from the clock 49 to the FFT 46. Additionally, the dynamic control circuitry 47 can respond to its inputs by controlling the operation of the FFT 46. The FFT 46 is designed to perform an N-point fast fourier transform on the OFDM symbol, but depending on the control signals from the dynamic control circuitry 47, can perform an X-point FFT where X<N to dynamically change the number of carriers.

In the case of the maximum number of carriers, the resulting N complex carriers are input into a phase estimation block 48 and a phase compensation block 50. The phase estimation block 48 tracks the phases of the N carriers and provides phase estimates to the phase compensation block 50 which compensates the N carriers accordingly. The compensated carriers are input into decoding block 52 which decodes the forward error correcting code of the transmitter 10 (FIG. 1) and provides the data signals to the data destination block 51. Depending on its inputs, the dynamic control circuitry 47 can control the decoding block 52 to dynamically change the decoding rate and/or the demodulation scheme, thereby dynamically changing the operating parameters and/or characteristics, such as the data rate.

Figure 5:
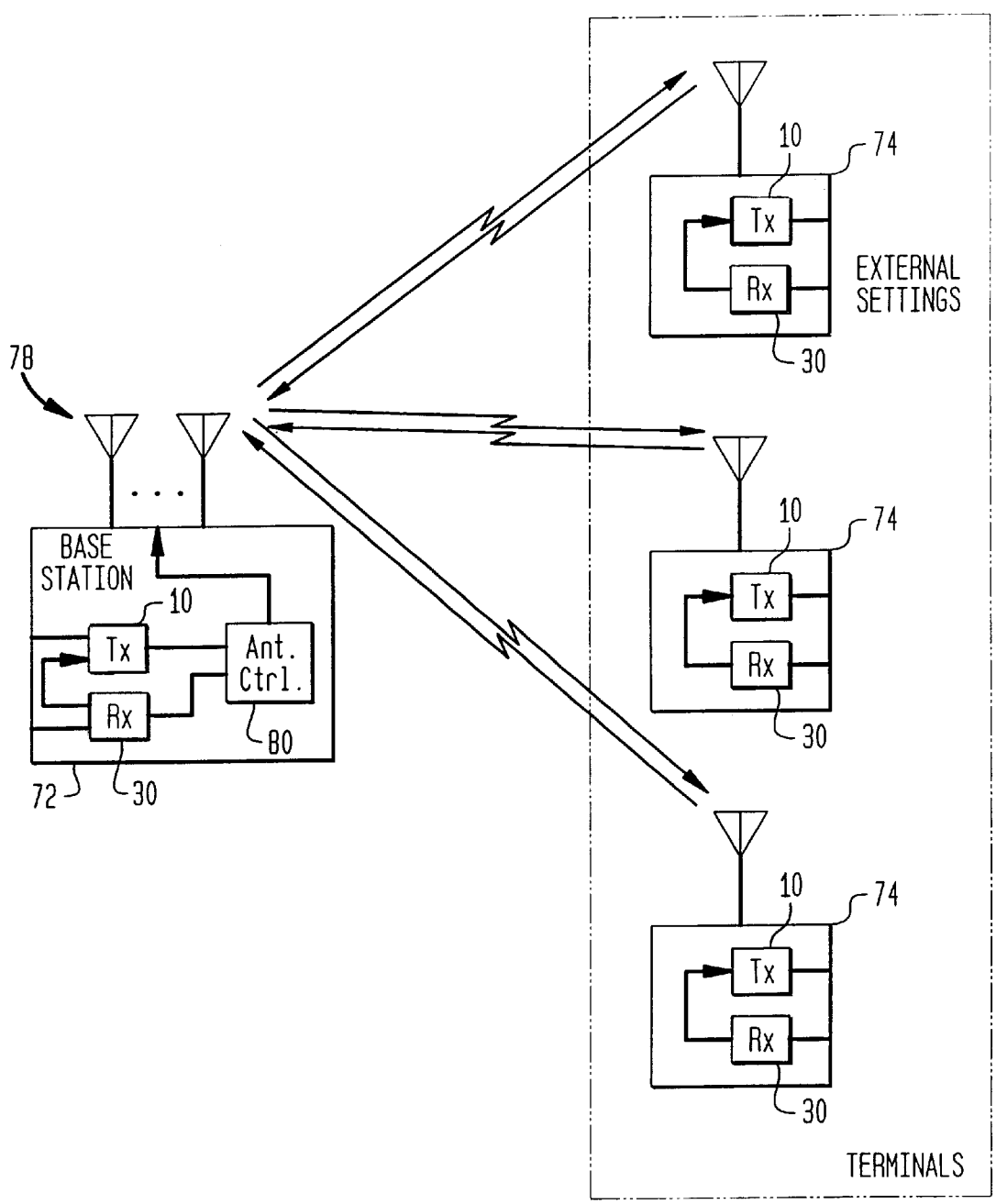
FIG. 5 shows an OFDM system using OFDM transmitters and receivers according to the principles of the present invention.

FIG. 5 shows an improved OFDM system 70 consisting of a base station 72 and a number of remote stations 74 which use dynamically scaleable OFDM transmitters 10 (FIG. 1) and receivers 30 (FIG. 4) according to the principles of the present invention to provide a dynamically scaleable OFDM system 70. The dynamic control circuitry 15 (FIG. 1) and 47 (FIG. 4) provides scaleability of operating parameters and/or characteristics between the base station 72 and the remote units 74. In the case of dynamically scaling the data rate, the improved OFDM system starts with low data rate between the base station 72 and a remote unit 74. Then, the dynamic control circuitry 15 (FIG. 1) of the transmitting station increases the data rate as the system design and signal quality permits. If the signal quality degrades, the dynamic control circuitry 15 (FIG. 1) decreases the data rate. The signal quality can be measured by one of the following: received signal strength, received signal to noise plus interference ratio, detected errors (CRC), the presence of acknowledgments (lack of acknowledgments the link for communication signals is bad). Additionally, other operating characteristics and/or parameters can be similarly monitored and scaled.

The OFDM receiver 30 (FIG. 4) of the receiving station 72 or 72 can perform these measurements on received signals, after which the dynamic control circuitry 47 determines what data rate or other operating characteristics and/or parameters to use and what data rate or other operating characteristics and/or parameters to use in the reverse direction. Accordingly, the receiver 30 provides feedback to the dynamic control circuitry 15 of the transmitter 10 of the receiving station 72 or 74 to dynamically scale the operating characteristics and/or parameters, such as the data rate, between the two stations. Alternatively, the receiver 30 (FIG. 4) of the receiving station 72 or 74 can perform the signal quality measurements and send back the quality information or a request for particular operating characteristics and/or parameters, such as data rate, through its transmitter 10 to the receiver 30 of the transmitting station 72 or 74. The receiver 30 of the transmitting station 72 or 74 then can provide feedback to the dynamic control circuitry 15 at the transmitting station 72 or 74 to dynamically scale the operating characteristics and/or parameters, such as the data rate, between the stations 72 or 74. Although this particular embodiment of the OFDM system 70 has a base station 72 and remote stations 74, the scaling features according to aspects of the present invention extend to a network of non-centralized OFDM transceivers.

Furthermore, in certain embodiments, the OFDM system 70 according to the principles of the present invention, can be used to implement multiple access of multi-rate systems by dynamically scaling the number of carriers. One remote station 74 could be sending on just one carrier, another remote station 74 on 4 other carriers, while a third remote station 74 could be sending on yet another 2 carriers, all at the same time. For proper decoding it is mandatory that the signals of all carriers (from different remote stations 74) are received with roughly the same relative delays by the base station 72.

In the case of certain embodiments of centralized systems which dynamically scale the number of carriers, the base station 72 receives from and transmits to all remote stations (mobile units 74 in this embodiment) within its range. Thus, the base station 72 of this particular embodiment should be capable of receiving and transmitting at all carriers simultaneously. This implies that the base station 72 faces a larger peak-to-average power ratio than the mobiles 74, but that is not really a drawback, since the base 72 is not battery-driven.

Transmitting on subsets of carriers provides the possibility of asymmetric data links, meaning that data rates can be different for uplink and downlink. Asymmetric links often occur in practice, e.g., downloading data. The OFDM system 70 can support such asymmetric links by dynamically providing remote stations 74 with a different number of carriers for uplink and downlink. Also, since in a centralized system the base station 72 can transmit at higher power levels than the mobiles 74, it is possible to use higher level modulation schemes on the carriers (e.g. 16 QAM), such that the downlink capacity is larger than the uplink capacity.

Advantages of using dynamic control circuitry 15 (FIG. 1) and 47 (FIG. 4) to achieve asymmetric rates are:

Downlink capacity can be made larger than uplink capacity.

Uplink capacity can be shared by dividing total number of carriers into subsets.

Mobiles 74 can transmit longer packets at a lower rate compared to pure TDMA. This has the advantage that the average transmitted power is lower (simpler power amplifier) and also that the relative overhead caused by training is reduced.

Mobiles 74 only have to transmit a limited number of carriers, which reduces the peak-to-average power of the transmitted signal. This means the mobiles 74 can achieve a better power efficiency, which is very important for battery-driven devices.

When different mobiles 74 are allowed to transmit simultaneously at different carriers, the following can arise:

Symbol synchronization is necessary between mobiles and base station. Such synchronization is already present in TDMA systems like GSM. For the described OFDM example with a symbol duration of 200 $\mu$s, the synchronization offset should be limited to about 5 $\mu$s.

Some power control is necessary to reduce near-far effects. The near-far effect is less serious than in CDMA systems, because the OFDM carriers are orthogonal, while CDMA codes usually have some non-zero cross-correlation. In OFDM, power control is only needed to reduce the dynamic range of A/D converters in the receiver, and to reduce multi-user interference caused by frequency offsets, which may introduce some correlation between carriers of different users.

In the previously described OFDM mobile phone option, with 32 carriers delivering 320 kbps in a bandwidth of 200 kHz, the band can be divided into 8 channels of 4 carriers each. Each channel then carries data at a raw rate of 40 kbps, which provides about 70% of redundancy for signaling overhead and forward error correction coding of a 13 kbps speech signal.

Thus, the OFDM system 70 can provide the advantages of asymmetric data rates when needed, such as during the downloading of data from the base station 72 to the remote station 74, by dynamically altering the number of carriers used for downlink to receiver 30 (FIG. 4) of the remote station 74 and for uplink from the transmitter 10 of the remote station 74. Additionally, the OFDM system 70 can dynamically scale various operating characteristics and/or parameters for the stations 72 and 74 and can provide different operating characteristics and/or parameters between the base station 72 and different remote stations 74 or provide varying symmetric operating characteristics and/or parameters between the base station 72 and a remote unit 74. Alternatively, the dynamic scaling of operating parameters and/or characteristics between stations to provide different operating parameters and/or characteristics between the stations can be performed in a non-centralized OFDM system of transceivers.

In certain embodiment of the OFDM system 70 of FIG. 5, adaptive antennas 78 can be used at the base station 72 to make the antenna pattern adaptive and different for each carrier such that the signal-to-noise plus interference ratio is maximized for each carrier. In OFDM, the base 72 simply measures the amplitude of several carriers to obtain the spectrum of incoming signal which provides simultaneous adaptive antennas. Adaptive antenna control circuitry 80 can control the adaptive antennas 78 in the following manner to provide improved performance in the OFDM system 70:

Base 72 measures uplink channel (N carrier amplitudes, SNR/SIR), assuming downlink channel equal to uplink channel;

If downlink and uplink channels are not equal because they are at different frequencies for instance (as in UMTS), the mobile 74 can send measured downlink carrier amplitudes as feedback over the uplink to the base station 72;

In uplink, base station 72 uses adaptive antenna to maximize signal-to-noise and interference ratio; and In downlink, base station 72 uses measured uplink channel or feedback from mobile to select amplitudes and phases for each carrier and each antenna of the adaptive antennas 78. In this way, the OFDM system 70 benefits from improved antenna gain for each carrier. By transmitting more power in relatively good carriers, power is not wasted in carriers which do not reach the mobile 74 anyway.

As such, the adaptive antenna control in the OFDM system 70 provides improved efficient performance. Together with the dynamic control aspects of the OFDM system 70, a flexible OFDM system 70 is provided which can improve the operation between the stations by using the adaptive antenna system in conjunction with the dynamic control to improve the OFDM system performance. For example, a certain subset of carriers can be dynamically chosen taking into account feedback from the adaptive antenna control circuitry. Alternatively, in an embodiment of a network of non-centralized OFDM transceivers, the transceivers or a subset of the transceivers could take advantage of adaptive antennas.

Thus, the improved OFDM (Orthogonal Frequency Division Multiplexing) modulation system provides increased flexibility and adaptability by using scaleable operating characteristics and/or parameters which allow the improved OFDM system to operate in various communications environments. The improved OFDM system accomplishes this by dynamically changing operating parameters, such as the number of carriers, the symbol duration, the coding rate, the modulation scheme and/or the number of bits per symbol per carrier, to scale the operating parameters and/or characteristics of the OFDM system. The dynamic rate control circuitry can dynamically scale the operating parameters and/or characteristics of the OFDM system or various subsets of the operating parameters and/or characteristics while maintaining other operating characteristics and/or parameters fixed to achieve the desired operation or performance for the OFDM system.

In addition to the embodiments described above, alternative configurations of the improved OFDM modulation system are possible which omit or add components or use different components in performing the dynamic scaling of the OFDM system parameters and/or characteristics or a variation thereof. For example, only portions of the described control circuitry can be used to provide a subset of the scaling features, or separate control circuitry can be used which are associated with the various transmitter components. Additionally, the above-described OFDM system has been described as being comprised of several components, but it should be understood that the OFDM system and portions thereof can be employed using application specific integrated circuits, software driven processing circuitry, or other arrangements of discrete components.

What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

What is claimed is:

1. A method for providing communication signals according to operating parameters using orthogonal frequency division multiplexing (OFDM), said operating parameters including symbol duration, guard time interval, number of OFDM carriers, and number of bits per symbol per OFDM carrier, said method comprising the step of:

receiving a feedback signal from a receiver;

determining that an operating characteristic of said method should be scaled from a first level to a second level based on said feedback signal received from said receiver, said operating characteristic being at least one of transmission rate, signal-to-noise ratio, and delay-spread tolerance; and dynamically scaling at least one of said operating parameters for said method to achieve an operating characteristic of said second level by adaptively selecting one of a plurality of operating parameter scaling options in accordance with said determining step.

2. The method of claim 1 further comprising the steps of:
providing said communication signals at a data rate; and
dynamically changing said data rate.

3. The method of claim 1 further including the step of providing OFDM symbols from said communication signals, and wherein said step of dynamically scaling includes the step of:
dynamically changing symbol duration for said OFDM symbols.

4. The method of claim 3 wherein said step of dynamically changing further includes the step of:
transforming said communication signals into an OFDM symbol using a fourier transformation; and
altering a time base for said fourier transformation.

5. The method of claim 1 further including the step of providing OFDM symbols from said communication signals, and wherein said step of dynamically scaling includes the step of:
dynamically changing the number of carriers for said OFDM symbols.

6. The method of claim 5 wherein said step of dynamically scaling includes the step of:
transforming data inputs onto a subset of the maximum number of said carriers.

7. The method of claim 5 wherein said step of dynamically scaling includes the steps of:
transforming a subset of data inputs from said communication signals onto said carriers; and
setting the remaining data inputs to zero.

8. The method of claim 1 wherein said step of dynamically scaling includes the steps of:
coding communication signals according to a coding rate; and
dynamically changing said coding rate.

9. The method of claim 1 wherein said step of dynamically scaling includes the steps of:
modulating carriers according to a first modulation scheme; and
dynamically changing said first modulation scheme to a second modulation scheme.

10. The method of claim 1 further including the steps of:
transmitting OFDM symbols at an uplink data rate; and
receiving communication signals at a downlink data rate.

11. The method of claim 10 further including the steps of:
dynamically changing said downlink data rate.

12. The method of claim 10 further including the step of:
selecting a downlink data rate different from said uplink data rate.

13. The method of claim 12 wherein said step of selecting includes the step of:
using a number of carriers for transmitting said OFDM symbols and a different number of carriers for receiving said communication signals.

14. The method of claim 11 wherein said step of dynamically changing said downlink data rate includes the step of:
dynamically changing the number of carriers for said communication signals.

15. A method of receiving orthogonal frequency division multiplexed (OFDM) symbols according to operating parameters, said operating parameters including symbol duration, guard time interval, number of OFDM carriers, and number of bits per symbol per OFDM carrier, said method comprising the step of:
receiving an OFDM signal that includes OFDM symbols;
generating a feedback signal based on said OFDM signal and providing said feedback signal to dynamic control circuitry that determines whether an operating characteristic of OFDM symbols should be changed based on said feedback signal, said operating characteristic being at least one of transmission rate, signal-to-noise ratio, and delay-spread tolerance; and
dynamically changing at least one of said operating parameters for said method of receiving, thereby enabling said method to receive OFDM symbols provided in accordance with dynamically scaled operating characteristics.

16. A method of receiving orthogonal frequency division multiplexed (OFDM) symbols at a downlink data rate according to operating parameters, said operating parameters including symbol duration, guard time interval, number of OFDM carriers, and number of bits per symbol per OFDM carrier, said method comprising the steps of:
receiving an OFDM signal that includes OFDM symbols at a downlink data rate;
generating a feedback signal based on said OFDM signal, and providing said feedback signal to dynamic control circuitry that determines whether an operating characteristic of received OFDM symbols should be changed based on said feedback signal, said operating characteristic being at least one of transmission rate, signal-to-noise ratio, and delay-spread tolerance; and
dynamically changing said downlink data rate by adaptively selecting one of a plurality of operating parameter scaling options.

17. The method of claim 15 wherein said step of dynamically changing includes the step of:
dynamically changing symbol duration for the OFDM symbols.

18. The method of claim 17 wherein said step of dynamically changing further includes the step of:
altering a time base for a fourier transformation.

19. The method of claim 16 wherein said step of dynamically changing includes the step of:
dynamically changing the number of carriers for said OFDM symbols.

20. The method of claim 16 wherein said step of dynamically changing includes the steps of:
decoding said OFDM symbols according to a coding rate; and
dynamically changing said coding rate.

21. An orthogonal frequency division multiplexing (OFDM) system for providing communication signals according to operating parameters, said operating parameters including symbol duration, guard time interval, number of OFDM carriers, and number of bits per symbol per OFDM carrier, said system comprising dynamic control circuitry which receives a feedback signal from a receiver, determines whether an operating characteristic of said method should be scaled from a first level to a second level based on said feedback signal, said operating characteristic being at least one of transmission rate, signal-to-noise ratio, and delay-spread tolerance, and, after determining that said operating characteristic for providing communication signals should be scaled from said first level to said second level based on said feedback signal, provides control signals to signal circuitry to dynamically scale at least one of said operating parameters to achieve said operating characteristic of said second level, said control circuitry controlling a scalable operating characteristic by adaptively selecting one of a plurality of operating parameter scaling options.

22. The OFDM system of claim 21 wherein said signal circuitry transforms said communication signals into OFDM symbols having a symbol duration and transmits said OFDM symbols at a data rate, said dynamic control circuitry provides control signals to dynamically change said symbol duration for said OFDM symbols.

23. The OFDM system of claim 21 wherein said signal circuitry transforms said communication signals into OFDM symbols using a fourier transformation, said dynamic control circuitry provides control signals to dynamically alter a time base for said fourier transformation.

24. The OFDM system of claim 21 wherein said signal circuitry transforms said communication signals into OFDM symbols onto a number of carriers, said dynamic control circuitry provides control signals to dynamically change the number of carriers for said OFDM symbols.

25. The OFDM system of claim 21 wherein said signal circuitry codes communication signals according to a coding rate, said dynamic control circuitry provides control signals to dynamically changes said coding rate.

26. The OFDM system of claim 21 wherein said signal circuitry includes transmitter circuitry which transmits said communication signals at an uplink data rate and receiver circuitry which receives said communication signals at a downlink data rate, said dynamic control circuitry provides control signals to dynamically change said downlink data rate.

27. The OFDM system of claim 21 wherein said signal circuitry includes transmitter circuitry which transmits said communication signals at an uplink data rate using a number of carriers and receiver circuitry which receives said communication signals at a downlink data rate using a different number of carriers, said dynamic control circuitry provides control signals to dynamically change said number of carriers and said different number of carriers.

28. The method of claim 1, wherein the scalable operating characteristic is transmission rate, and said step of dynamically scaling adaptively selects an operating parameter scaling option which is suitable for the delay-spread characteristic of the communication environment to which said method is applied.

29. The system of claim 21, wherein said dynamic control circuitry adaptively selects an operating parameter scaling option which is suitable for the delay-spread characteristic of the communication environment to which said system is applied.

* * * * *